US005699220A

United States Patent [19]

Lee et al.

[11] Patent Number: 5,699,220

[45] Date of Patent: Dec. 16, 1997

[54] OVERVOLTAGE AUTOMATIC PREVENTION APPARATUS HAVING AN INDIVIDUAL FAULT DISPLAY AND PERMANENT GROUND FUNCTIONS

[75] Inventors: Kyung-Jae Lee; Se-Jung Yong; Ki-Ho Chung, all of Seoul, Rep. of Korea

[73] Assignee: Korea Basic Science Institute, Daejon, Rep. of Korea

[21] Appl. No.: 604,436

[22] Filed: Feb. 21, 1996

[30] Foreign Application Priority Data

Aug. 28, 1995 [KR] Rep. of Korea .................. 22552/1995

[51] Int. Cl.[6] .................................................. H02H 9/04

[52] U.S. Cl. .......................................... 361/120; 340/650

[58] Field of Search ................................ 361/54, 56, 91, 361/111, 112, 124, 117–120, 126; 340/635, 638, 644, 649, 650, 654, 664; 337/28, 29, 31, 32, 37; 324/556

[56] References Cited

U.S. PATENT DOCUMENTS 4,876,626 10/1989 Kaczmarek ............................ 361/119
5,282,109 1/1994 Smith ..................................... 361/119

*Primary Examiner*—Ronald W. Leja
*Attorney, Agent, or Firm*—Christie, Parker & Hale, LLP

[57] ABSTRACT

An improved overvoltage automatic prevention apparatus having individual fault displays and permanent ground functions capable of rapidly and safely protecting load parts of the system from overvoltage caused by a thunderbolt or surge and protecting the communication system by providing automatically operable permanent ground and individual fault display functions when a series of overvoltage is applied thereto, so that easier fault checks, system management, and maintenance is possible, which includes a gas tube connected to subscriber lines and both sides of the electrode surfaces having grooves and having a ground electrode connected to the ground; melting insulation materials inserted into the grooves and defining openings formed at recesses; a permanent ground-side spring connection bar inserted into the openings of the melting insulation materials and receiving a ground electrode of the gas tube and having protruded contact points formed on the inner sides of both connection plates; and a fault display lamp-side spring connection bar connected to an individual fault display lamp and having protruded contact points formed on the inner side of both connection plates and inserted into the other openings of the melting insulation material.

3 Claims, 8 Drawing Sheets

OVERVOLTAGE AUTOMATIC PREVENTION APPARATUS HAVING AN INDIVIDUAL FAULT DISPLAY AND PERMANENT GROUND FUNCTIONS

BACKGROUND OF THE INVENTION

1. Field of the Invention

The present invention relates to an overvoltage automatic prevention apparatus having an individual fault display and permanent ground functions, and particularly to an improved overvoltage automatic prevention apparatus having an individual fault display and permanent ground functions capable of rapidly and safely protecting load parts of the system from overvoltages caused by a thunderbolt or surge and protecting a communication system by providing automatically operable permanent ground and individual fault display functions when a series of overvoltages are applied thereto, so that easier fault check, system management, and maintenance is possible.

2. Description of the Conventional Art

FIG. 1A shows a conventional overvoltage automatic prevention apparatus. FIG. 1B shows an equivalent circuit of a conventional overvoltage automatic prevention apparatus when the apparatus is in a normal state. FIG. 1C shows a conventional overvoltage automatic prevention apparatus so as to show a normal operation of the same. FIG. 1D shows an equivalent circuit of a conventional overvoltage automatic prevention apparatus when an overvoltage is applied to the apparatus. FIG. 1E shows a conventional overvoltage automatic prevention apparatus which shows the operation of the same when overvoltage is applied to the apparatus.

As shown therein, subscriber lines L1 and L2 are connected to both sides of electrode surfaces 2 and 3 of a gas tube 1 which is an overvoltage prevention device. Both sides of the electrode surfaces include grooves 2*a* and 3*a*. Melting insulation materials 5 and 6 having recesses 5*a* and 6*a* are inserted into the grooves 2*a* and 3*a*. Both sides of connection plates 4*a* and 4*b* of a spring connection bar 4 having a ground electrode of the gas tube 1 provide slight pressure to the melting insulation materials 5 and 6. The melting insulation materials 5 and 6 are molten when an overvoltage is applied thereto, so that both sides of the connection plates 4*a* and 4*b* of the spring connection bar 4 come into contact with both sides of the electrode surfaces 2 and 3, and the overvoltage flowing to the subscriber lines L1 and L2 flows to the ground 7.

The operation of the conventional overvoltage automatic apparatus will now be explained with reference to the accompanying drawings.

To begin with, when a thunderbolt or surge is applied to switch-side lines T1 and T2 through the subscriber lines L1 and L2, the gas in the gas tube 1 is ionized, and the electrode surfaces 2 and 3 connected to the subscriber lines L1 and L2 and ground 7 are automatically discharged, so that overvoltage flowing to the switch-side lines T1 and T2 is blocked. In addition, when overvoltage continuously flows thereto, fire at both sides of the electrode surfaces 2 and 3 of the gas tube 1 may take place due to over heating of the gas tube 1, so that the characteristic of the system may be changed and damage of the system may occur. At this time, the melting insulation materials 5 and 6 inserted into the grooves 2*a* and 3*a* are molten by heat from both sides of the electrode surfaces 2 and 3 from gas tube 1 as shown in FIG. 1E, and both sides of the connection plates 4*a* and 4*b* of the spring connection bar 4 come into contact with the electrode surfaces 2 and 3 as shown in FIG. 1D forming an equivalent circuit. Therefore, the overvoltage applied from the subscriber lines L1 and L2 flows to ground 7 through the ground electrode 1*a*, so that the load parts of the switch-side lines T1 and T2 are protected from the overvoltage applied thereto.

However, the conventional overvoltage automatic prevention apparatus has certain disadvantages in that even though the switch-side system can be protected from the overvoltage applied thereto by discharging the overvoltage to ground 7, the apparatus should be replaced with a new one after the overvoltage was applied thereto. Otherwise, the system remains continuously disconnected, which makes it difficult to provide subscribers with quality service and to achieve a better system management and maintenance.

SUMMARY OF THE INVENTION

It is an object of the present invention to provide an overvoltage automatic prevention apparatus having individual fault displays and permanent ground functions, which overcome the problems encountered in a conventional overvoltage automatic prevention apparatus having individual fault displays and permanent ground functions.

It is another object of the present invention to provide an improved overvoltage automatic prevention apparatus having individual fault displays and permanent ground functions capable of rapidly and safely protecting load parts of the system from overvoltage caused by a thunderbolt or surge and protecting the communication system by providing automatically operable permanent ground and individual fault display functions when a series of overvoltage is applied thereto, so that easier fault checks, system management, and maintenance is possible.

To achieve the above objects, there is provided an overvoltage automatic prevention apparatus having individual fault displays and permanent ground functions, which includes a gas tube connected to the subscriber lines and both sides of the electrode surfaces having grooves and a ground electrode connected to the ground; melting insulation materials inserted into the grooves and defining openings formed at recesses; a permanent ground-side spring connection bar inserted into the openings of the melting insulation materials and receiving a ground electrode of the gas tube and having protruded contact points formed on the inner sides of both connection plates; and a fault display lamp-side spring connection bar connected to an individual fault display lamp and having protruded contact points formed on the inner side of both connection plates and inserted into the other openings of the melting insulation material.

DETAILED DESCRIPTION OF THE INVENTION

Figure 1A:
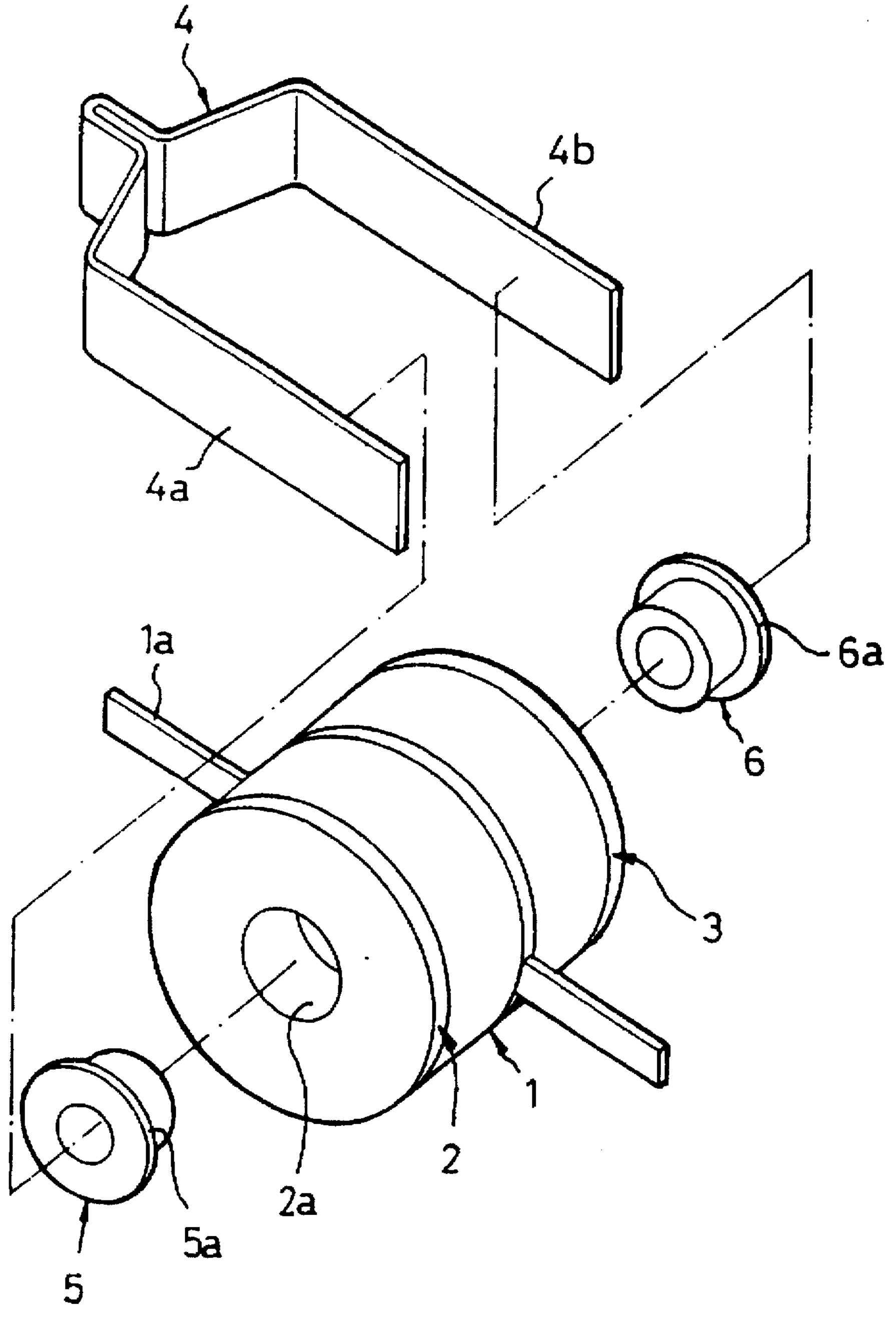
FIG. 1A PRIOR ART
FIG. 1A is an exploded view of a conventional overvoltage automatic prevention apparatus.
Figure 1B:
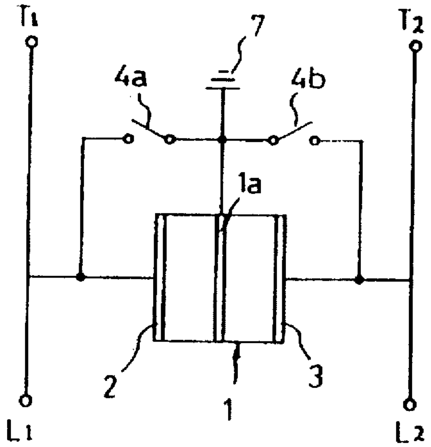
FIG. 1B PRIOR ART
FIG. 1B is an equivalent circuit diagram of a conventional overvoltage automatic prevention apparatus when the apparatus is in a normal state.
Figure 1C:
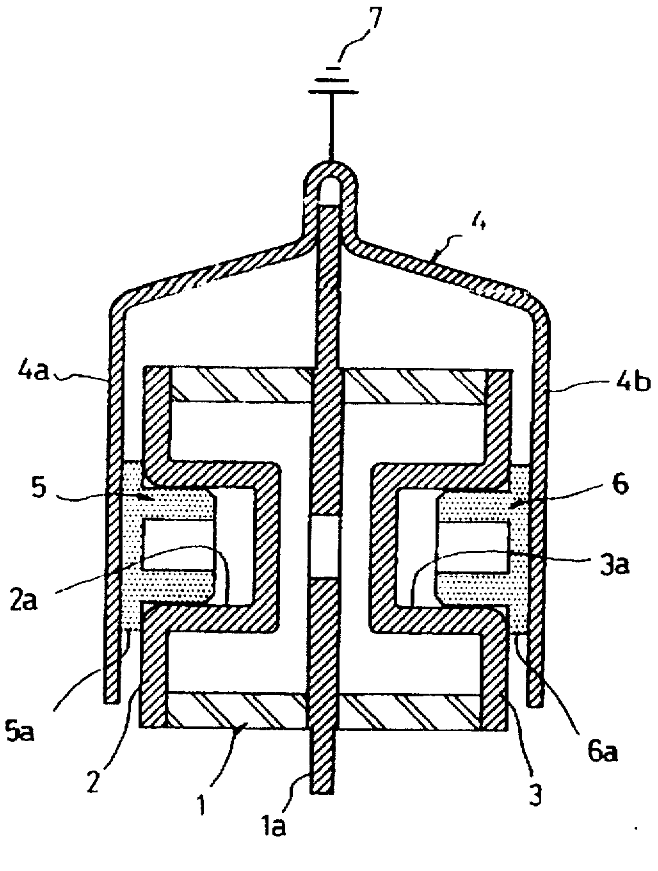
FIG. 1C PRIOR ART
FIG. 1C is a cross-sectional view of a conventional overvoltage automatic prevention apparatus so as to show a normal operation of the same.
Figure 1D:
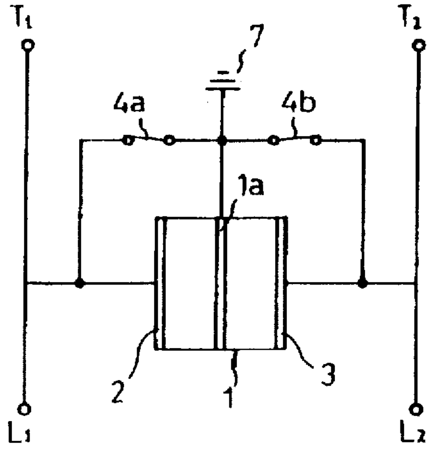
FIG. 1D PRIOR ART
FIG. 1D is an equivalent circuit diagram of a conventional overvoltage automatic prevention apparatus when overvoltage is applied to the apparatus.
Figure 1E:
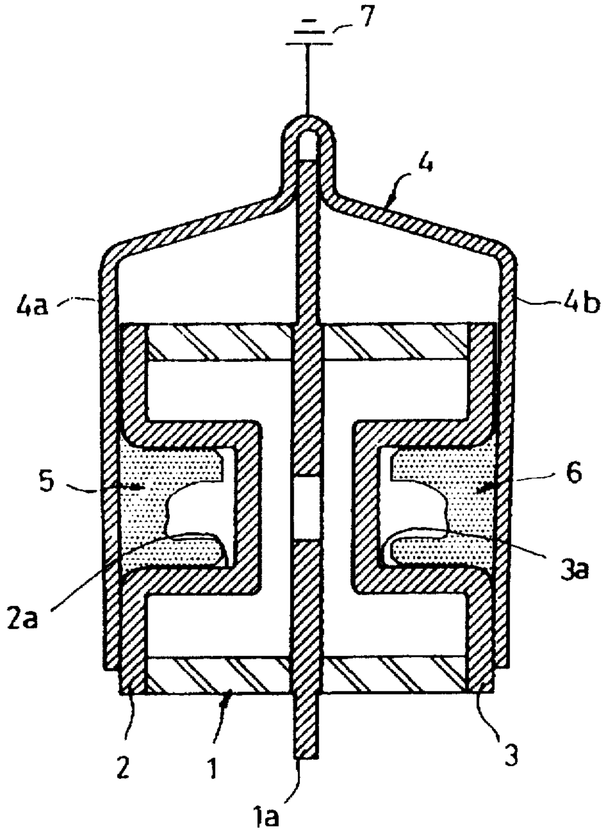
FIG. 1E PRIOR ART
FIG. 1E is a cross-sectional view of a conventional overvoltage automatic prevention apparatus to show an operation of the same when overvoltage is applied to the apparatus.
Figure 2A:
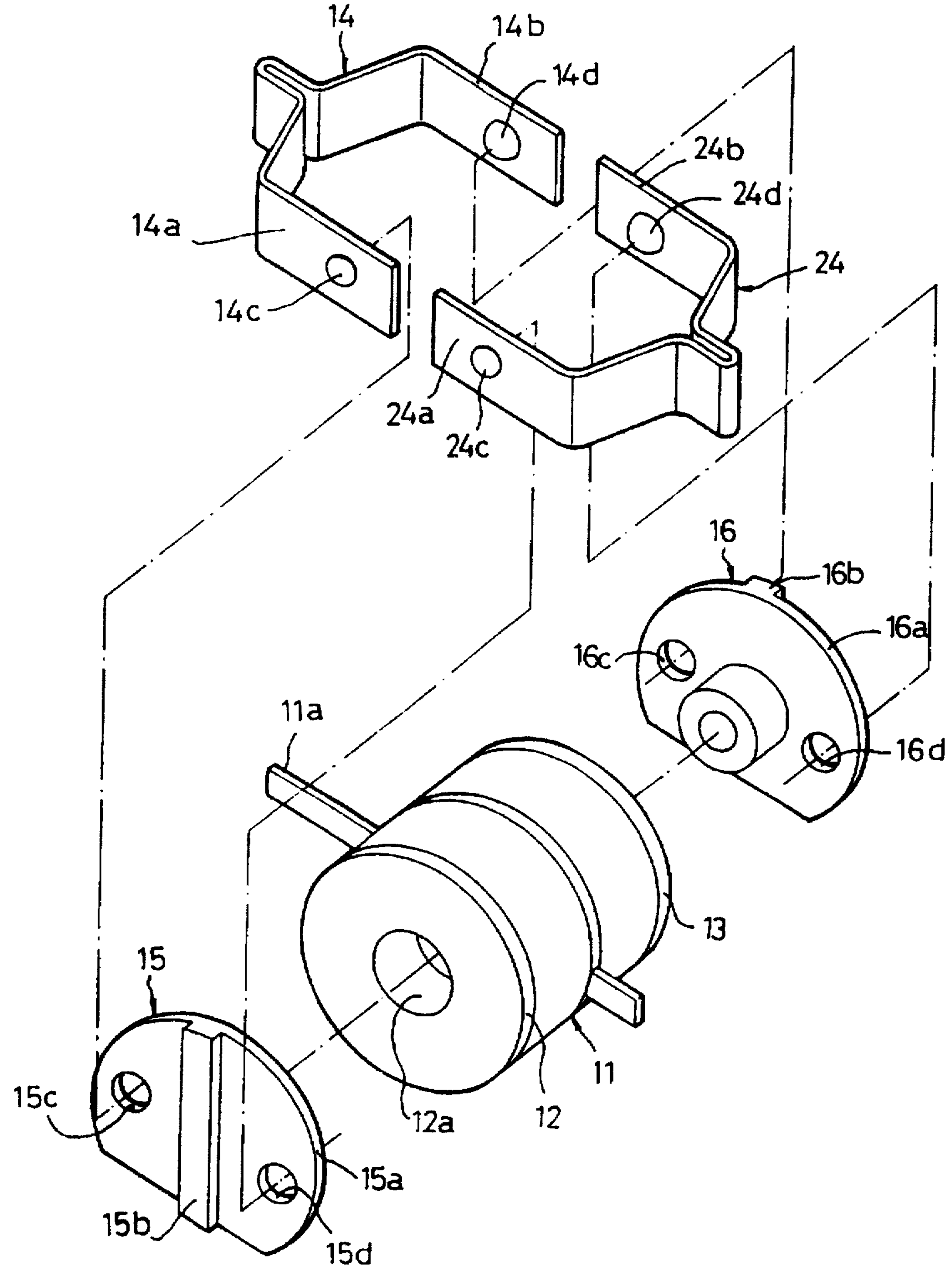
FIG. 2A is an exploded view of an overvoltage automatic prevention apparatus having individual fault displays and permanent ground functions according to the present invention.
Figure 2B:
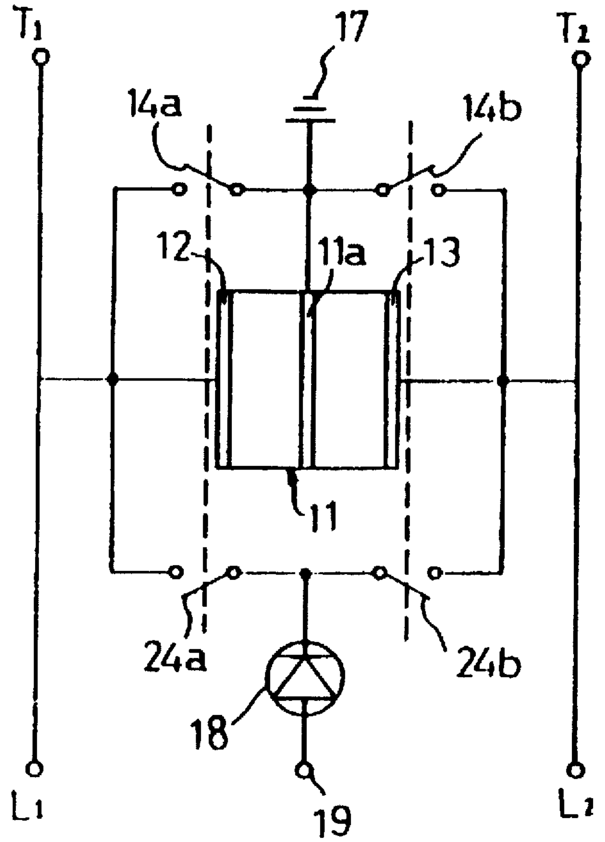
FIG. 2B is an equivalent circuit diagram of an overvoltage automatic prevention apparatus having individual fault displays and permanent ground functions when the apparatus is in a normal state according to the present invention.
Figure 2C:
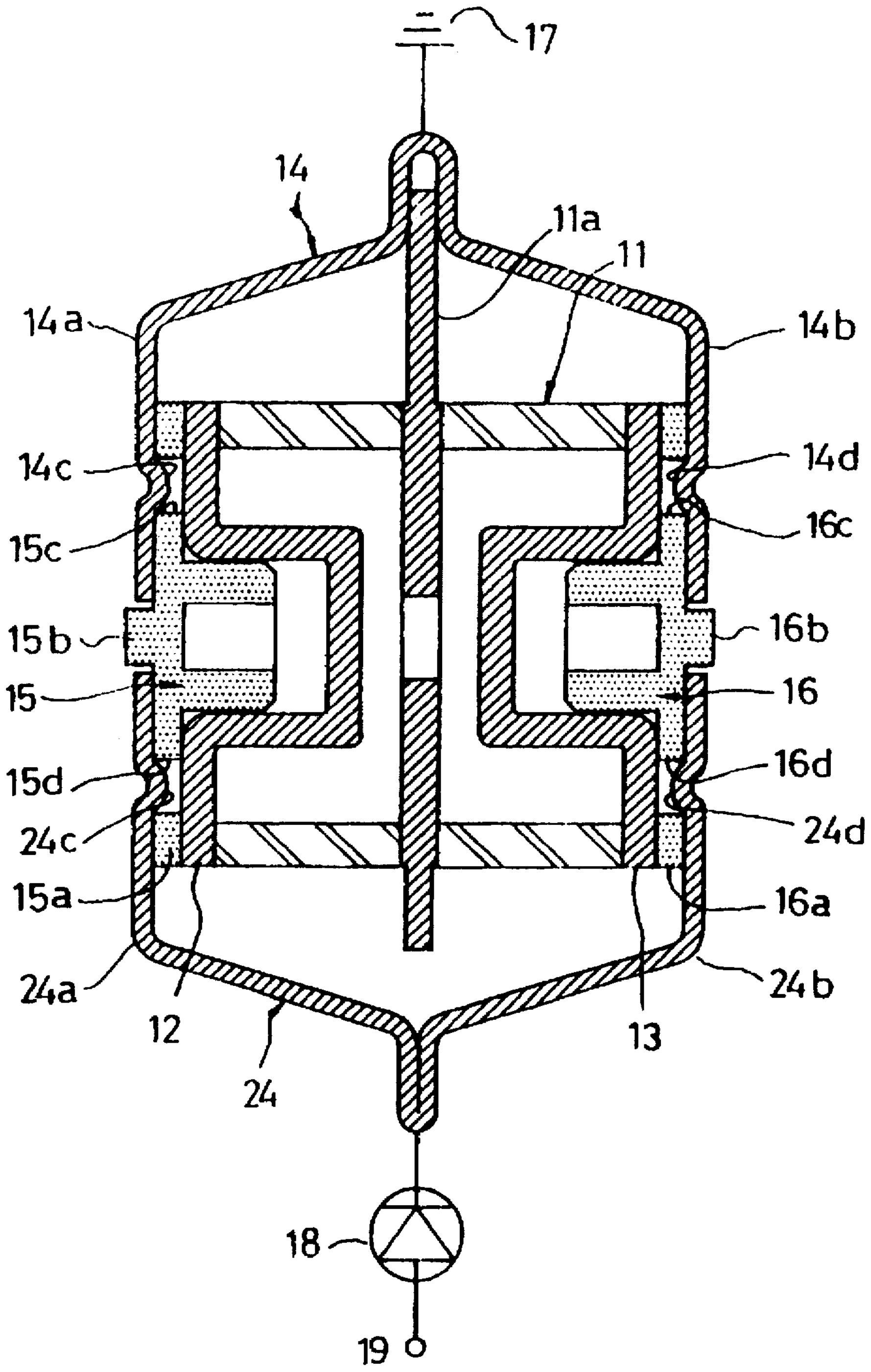
FIG. 2C is a cross-sectional view of an overvoltage automatic prevention apparatus having individual fault displays and permanent ground functions so as to show a normal operation of the same according to the present invention.
Figure 2D:
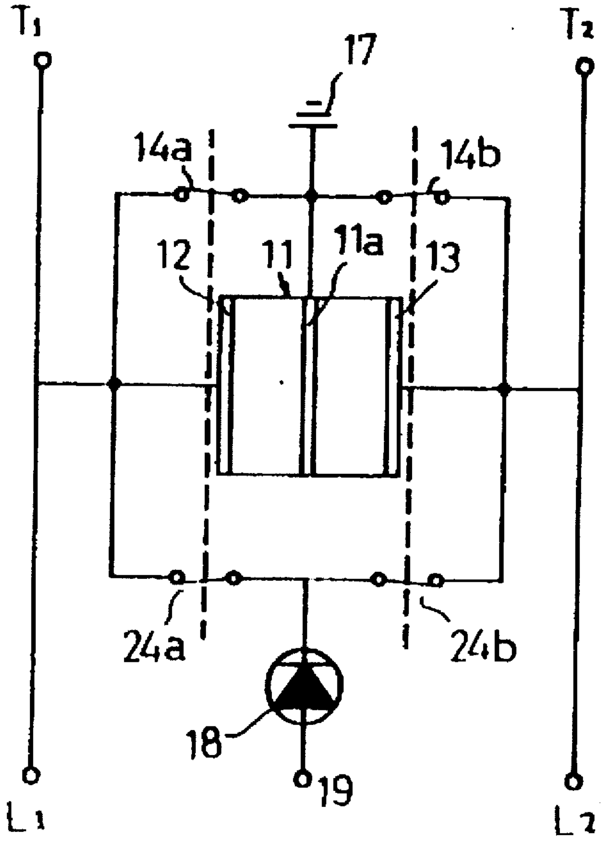
FIG. 2D is an equivalent circuit diagram of an overvoltage automatic prevention apparatus having individual fault displays and permanent ground functions when overvoltage is applied to the apparatus according to the present invention.
Figure 2E:
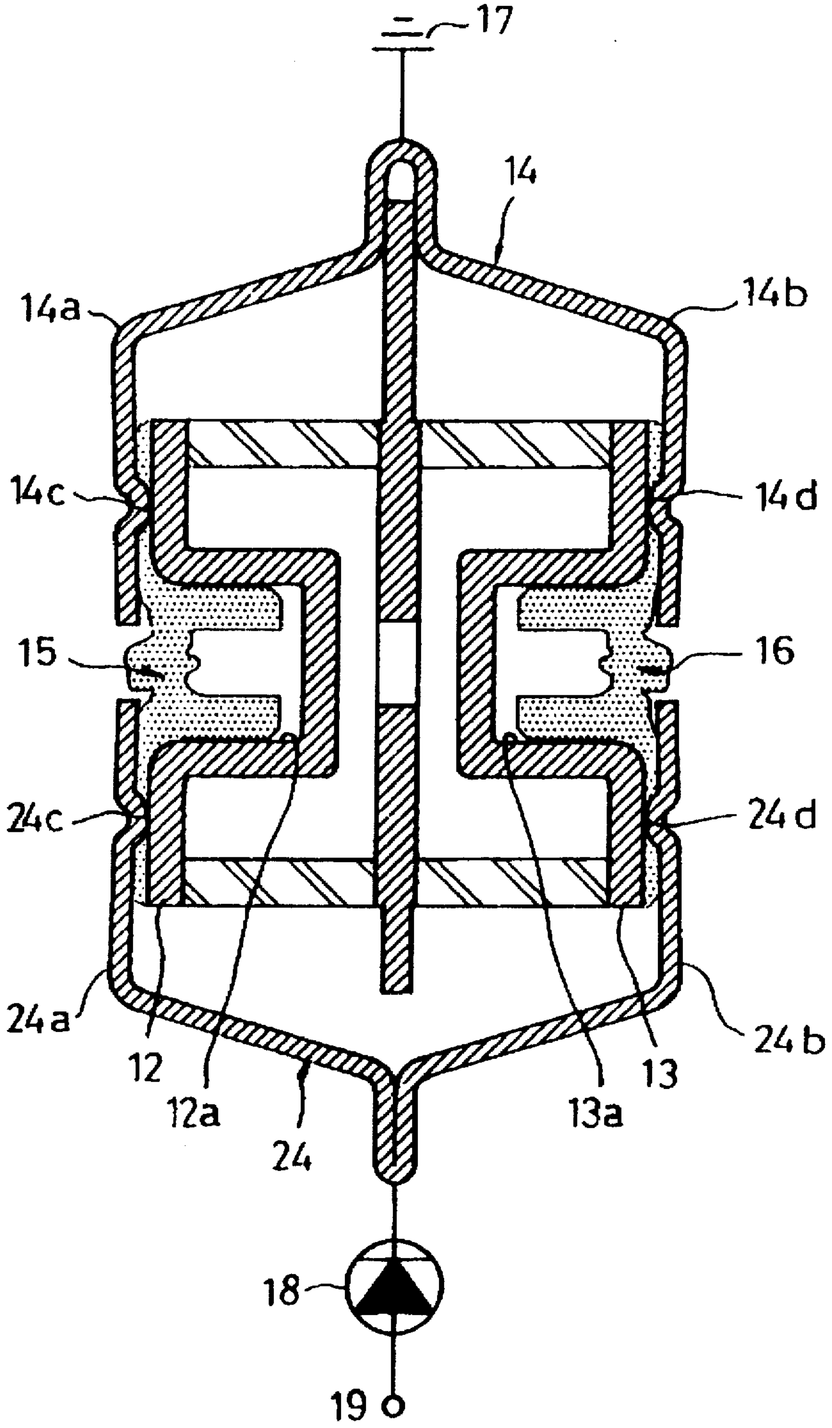
FIG. 2E is a cross-sectional diagram of an overvoltage automatic prevention apparatus having individual fault displays and permanent ground functions so as to show an operation state of the same when overvoltage is applied to the apparatus according to the present invention.

FIG. 2A shows an overvoltage automatic prevention apparatus having an individual fault display and permanent ground functions. FIG. 2B shows an equivalent circuit of an overvoltage automatic prevention apparatus having an individual fault display and permanent ground functions when the apparatus is in a normal state. FIG. 2C shows an overvoltage automatic prevention apparatus having individual an fault display and permanent ground functions which show a normal operation of the same. FIG. 2D shows an equivalent circuit of an overvoltage automatic prevention apparatus having an individual fault display and permanent ground functions when overvoltage is applied to the apparatus according to the present invention. FIG. 2E shows an overvoltage automatic prevention apparatus having an individual fault display and permanent ground functions which show an operation state of the same when overvoltage is applied to the apparatus.

As shown therein, subscriber lines L1 and L2 are connected to both sides of the electrode surfaces 12 and 13 of a gas tube 11 which is an overvoltage prevention device. Grooves 12*a* and 13*a* are formed at both sides of the electrode surfaces 12 and 13. Melting insulation materials 15 and 16 having recesses 15*a* and 16*a* are inserted into the grooves 12*a* and 13*a*. Separating members 15*b* and 16*b* are formed at the intermediate portion of the melting insulation materials 15 and 16, and spaced-apart openings 15*c*, 15*d*, 16*c*, and 16*d* are formed about the separating members 15*b* and 16*b*. Inwardly protruded contact points 14*c* and 14*d* are formed on both sides of the connection plates 14*a* and 14*b* of a permanent ground-side spring connection bar 14 having a ground electrode 11*a* of the gas tube 11. The protruded contact points 14*c* and 14*d* are half inserted into the openings 15*c* and 16*c* of the melting insulation materials 15 and 16, and inwardly protruded contact points 24*c* and 24*d* are formed on both sides of the connection plates 24*a* and 24*b* of a fault display lamp-side spring connection bar 24 connected to a fault display lamp 18. The protruded contact points 24*c* and 24*d* are half inserted into the openings 15*d* and 16*d* of the melting insulation materials 15 and 16. The melting insulation materials 15 and 16 are molten when overvoltage is applied thereto from the subscriber lines L1 and L2, so that the protruded contact points 14*c*, 14*d*, 24*c*, and 24*d* are inserted into the openings 15*c*, 16*c*, 15*d*, and 16*d* of the melting insulation materials 15 and 16 and come into contact with both sides of the electrode surfaces 12 and 13. As a result, overvoltage flowing from the subscriber lines L1 and L2 flows to ground 17 through a ground electrode 11*a* and an individual fault display lamp 16 is turned on a to indicate that the system has a fault.

The operation of the overvoltage automatic prevention apparatus having individual fault displays and permanent ground functions will now be explained with reference to the accompanying drawings.

To begin with, when an overvoltage having a certain level higher than a threshold level is applied to the subscriber lines L1 and L2, the gas tube 11, which is an overvoltage prevention device, is automatically discharged between both sides of the electrode surfaces 12 and 13 and ground 17. The subscriber lines L1 and L2 form a closed circuit with respect to ground 17. Thereafter, when an overvoltage is not applied thereto, the subscriber lines L1 and L2 are from ground 7, so that a normal system operation is achieved.

That is, as shown in FIG. 2C, the protruded contact points 14*c* and 14*d*, inserted into the openings 15*c*, 16*c*, 15*d*, and 16*d* of the melting insulation materials 15 and 16, of both sides of the connection plates 14*a* and 14*b* of the permanent ground-side spring connection bar 14 and the protruded contact points 24*c* and 24*d* of both sides of the connection plates 24*a* and 24*b* of the fault display lamp-side spring connection bar 24 come off from both sides of the electrode surfaces 12 and 13, so that as shown in FIG. 2B, an equivalent circuit is formed, and a normal communication operation can be achieved.

Meanwhile, when a series of overvoltages having a certain level higher than the threshold level of the gas tube 11, which is an overvoltage prevention device, is continuously applied to the subscriber lines L1 and L2, both sides of the electrode surfaces 12 and 13 of the gas tube 11 and ground 17 come into contact with each other. Heat is generated at both sides of the electrode surfaces 12 and 13. The melting insulation materials 15 and 16 are molten. The protruded contact points 14*c* and 14*d* formed on both sides of the connection plates 14*a* and 14*b* of the ground-side spring connection bar 14 are connected with both sides of the electrode surfaces 12 and 13 of the gas tube discharging plate 11 as shown in FIG. 2E. Overvoltage from the subscriber lines L1 and L2 flows to ground 17 through the ground electrode 11*a*. In addition, when the melting insulation materials 15 and 16 are molten by a certain overvoltage having a level higher than the threshold level, as shown in FIG. 2E, the protruded contact points 24*c* and 24*d* of both sides of the connection plates 24*a* and 24*b* of the fault display lamp-side spring connection bar 24, to which one side surface of the individual fault display lamp 18 is connected, are connected to both sides of the electrode surfaces 12 and 13 of the gas tube 11 in cooperation with the permanent ground-side spring connection bar 14. That is, if the melting insulation material 15 is molten by an overvoltage applied thereto, as shown in FIG. 2E, the protruded contact points 14*c* and 24*c* formed on one side of the connection plates 14*a* and 24*a* of the spring connection bars 14 and 24 are connected to the electrode surface 12 of the gas tube 11. In addition, if the melting insulation material 16 is molten by an overvoltage applied thereto, the protruded contact points 14*d* and 24*d* formed on the other side of the connection plates 14*b* and 24*b* of the spring connection bars 14 and 24 are connected to the electrode surface 13 of the gas tube 11, so that an equivalent circuit can be obtained as shown in FIG. 2D.

Therefore, at this time, since the overvoltage is applied to one side of the connection plates 24a and 14a of the spring connection bars 24 and 14 through the individual fault display lamp 18, or since the overvoltage is applied to ground through the other side of the connection plates 24b and 14b, the individual fault display lamp 18 is turned on to indicate that the system has a certain fault.

As described above, the overvoltage automatic prevention apparatus an individual fault display and permanent ground functions is directed to protecting the system when an overvoltage having a certain level higher than the threshold level of a gas tube, which is an overvoltage prevention device, is applied to subscriber lines, and providing a fault display lamp, which is turned on to indicate that the system has a fault, so that it is easy to check whether the system has a fault when an overvoltage is applied to the system, thus achieving better system operation, management, and maintenance by accurately checking the problems of the system.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An overvoltage automatic prevention apparatus having an individual fault display and permanent ground functions, comprising:
   - a gas tube for connecting to subscriber lines, the gas tube having spaced apart electrode surfaces, the electrode surfaces each having a groove formed therein, and the gas tube having a ground electrode for connecting to ground;
   - meltable insulation members each of which is inserted into a different one of said grooves, each of the insulation members comprising a separating member having first and second openings;
   - a permanent ground-side spring connection bar having protrusions formed at an inner surface thereof, the protrusions being inserted into the first openings, the permanent ground side spring connection bar being adapted to receive the ground electrode of said gas tube; and
   - a fault display lamp-side spring connection bar connected to an individual fault display lamp and having protrusions formed at an inner surface thereof, the protrusions being inserted into the second openings,
   - wherein the permanent ground-side spring connection bar and the fault display lamp-side spring connection bar are opposed and spaced apart from each other.

2. The apparatus of claim 1 wherein said protrusions of the permanent ground-side connection bar and the fault display lamp-side spring connection bar are partially inserted into said first and second openings, respectively.

3. An overvoltage automatic prevention apparatus having an individual fault display and permanent ground functions, comprising:
   - a gas tube for connecting to subscriber lines, the gas tube having spaced apart electrode surfaces, the electrode surfaces each having a groove formed therein, and the gas tube having a ground electrode for connecting to ground;
   - meltable insulation members each of which is inserted into a different one of said grooves, each of the insulation members having a first opening and a second opening;
   - a permanent ground-side spring connection bar having protrusions formed at an inner surface thereof, the protrusions being partially inserted into the first openings of said meltable insulation members, the permanent ground side spring connection bar being adapted to receive the ground electrode of said gas tube; and
   - a fault display lamp-side spring connection bar connected to an individual fault display lamp and having protrusions formed at an inner surface thereof, the protrusions being partially inserted into the second openings of the meltable insulation members.

* * * * *